Dec. 9, 1958  W. A. BARNES  2,863,344
APPARATUS FOR BUTT WELDING
Filed Jan. 13, 1955  3 Sheets-Sheet 1

INVENTOR.
William A. Barnes
BY Ray S. Pyle
atty

Dec. 9, 1958

W. A. BARNES 2,863,344

APPARATUS FOR BUTT WELDING

Filed Jan. 13, 1955

INVENTOR.
William A. Barnes
BY Ray S. Pyle
atty

Dec. 9, 1958 W. A. BARNES 2,863,344
APPARATUS FOR BUTT WELDING
Filed Jan. 13, 1955 3 Sheets-Sheet 3

INVENTOR.
William A. Barnes
BY Ray S Pyle
atty

United States Patent Office 2,863,344
Patented Dec. 9, 1958

2,863,344

APPARATUS FOR BUTT WELDING

William A. Barnes, Utica, N. Y., assignor, by mesne assignments, to Kelsey-Hayes Company, Detroit, Mich., a corporation of Delaware Application January 13, 1955, Serial No. 481,596

5 Claims. (Cl. 78—82)

This invention relates in general to the uniting of metal members by controlled conditions of pressure and confinement of flow to produce a solid phase bond at a temperature less than the normal welding temperature thereof, and relates more specifically to tooling to produce the union.

The union of two metallic members by the use of controlled cold flow of the metal structures is relatively recent accomplishment insofar as reducing the basic principles to a practical and usable procedure is concerned.

It has long been known that metal can flow at room temperature under proper conditions of loading. It is possible that the uniting, or welding, of two metal objects by controlled application of high pressure at room temperature has been known. However, the reduction of this knowledge to a practical level has only recently been accomplished. United States Patents Nos. 2,522,408 and 2,698,548 were granted to Sowter for his development in cold pressure welding.

Some metals will actually diffuse in such manner that a polished section of the union will not reveal a distinct junction between the two original members. Other metals have a distinct line dividing the original members. It has not definitely been determined what the nature of the union is in this line. It is definitely established, however, that an exceptionally strong union is produced between the two original members whether or not there is an actual diffusion. It is not the concern of the present invention whether the union is achieved by actual diffusion or some other phenomena of metal union, but rather with the means to obtain a desired result. Accordingly, in this specification and in the claims, reference will be made to a union between members caused by controlling cold flow of the metal structures, or to a cold weld. It is not intended that this invention should be limited by the choice of words to describe the junction between the members.

Therefore, an object of this invention is to provide a tool for holding two workpieces in proper relative position and confined to a predetermined flow, while separately applying a work force causing the workpieces to impinge under high pressure and flow together into a united structure.

Another object of this invention is to provide a tool having separate work jaws for first grasping workpieces and thereafter applying a work action upon the pieces so held.

Yet another object of this invention is to provide opposed force members, a prime mover, such as a punch press, and to simultaneously close a split die member and move the split die member transversely of the path of the prime mover toward an anvil or another die member.

Still another object of this invention is to provide the movement of the die by a component of force from the closing of the prime mover, by cam means, and to thereby provide a selected ratio of closing force upon the die with respect to the force of movement in the transverse direction.

And another object of this invention is to provide a split die construction and a closing pressure to grip a workpiece with sufficient force that the workpiece is extended to a slight degree from the die to thereby counteract forces tending to force the workpiece back into the die.

And yet another object of this invention is to provide for interlocking of cooperating split die members upon engagement to thereby obtain uniform workpiece formation.

A further important object of the invention is the provision of an improved pressure welding tool of simple construction for the welding in a butt joint of ductile and cold pressure weldable metal, such as rods, wires, tubes, strips or the like, whereby the members to be welded may be easily and readily inserted in and removed from the gripping dies of the tool and operated in a single operating step or stroke, in such a manner as to both properly hold or grip the members by the dies and at the same time to press or ram the butted ends to upset and weld the same by a solid phase bond by the intense resultant interfacial metal flow.

Other objects and a fuller understanding of the invention may be had by referring to the following description and claims, taken in conjunction with the accompanying drawings, in which:

Figure 1:
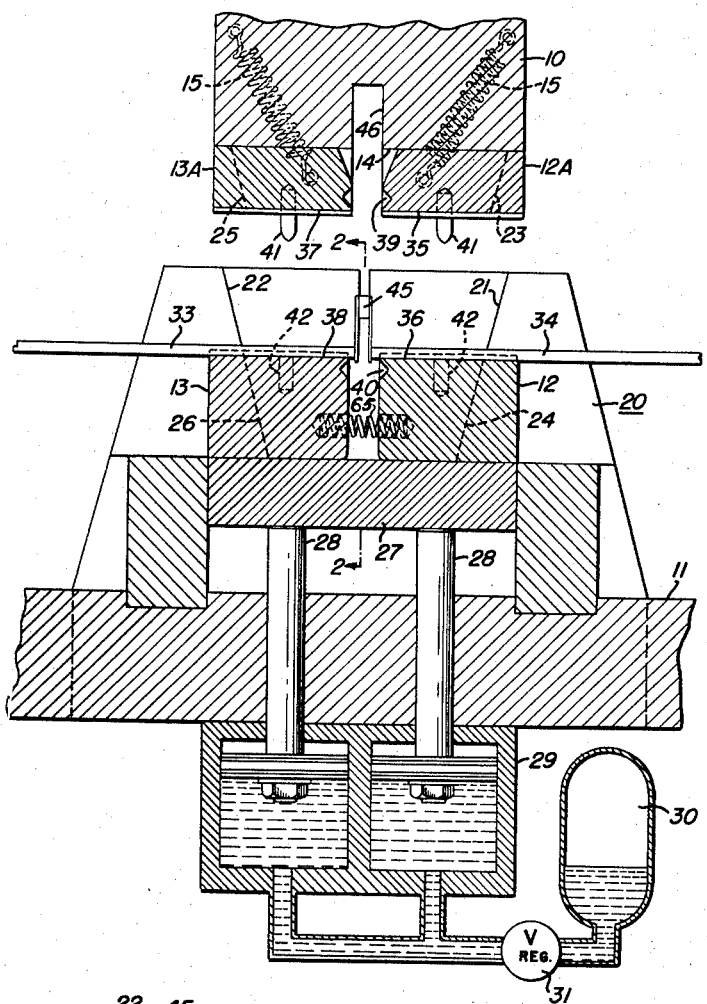
Figure 1 is a schematic side view, partially in section, illustrating a punch press type of prime mover with opposed split dies actuated to move toward one another by cam means, and controlled in compression force upon the dies by a retractable resistance.
Figure 2:
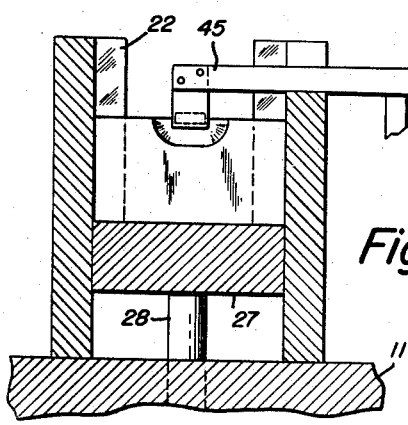
Figure 2 is a section taken along line 2—2 of Figure 1.

The drawings set forth a diagrammatic illustration of the power unit into which the present invention is incorporated because of the fact that various types of basic prime movers may be employed successfully. However, the fragmentary illustration is intended to represent a conventional punch press of either hydraulic or mechanical type of operation. The ram of such a device is indicated by the reference character 10 and the bed by the reference character 11. In such a construction, the ram is movable and the bed is stationary, although it is possible to employ two movable power devices to obtain the desired closing drive.

The particular illustrated embodiment of the invention is intended for the union of rod shaped workpieces in a butt type joint. This type of workpiece is for illustration purposes only.

Furthermore, the present invention is not necessarily limited to cold welding or to butt welding, although the primary purpose of the invention is for expediting the butt weld union of workpieces by means of split dies. Accordingly, the drawings illustrate two split dies. One split die is indicated by the reference characters 12 and 12A. The other split die is represented by the reference characters 13 and 13A. Parts 12 and 13 are mounted on a retractable table 27 whereas parts 12A and 13A are carried with the ram 10. Parts 12A and 13A are held against a track surface 14 on the ram 10 by means of suitable springs 15. Therefore, the die parts 12A and 13A are held against the surface 14 but are free to move laterally with respect to the vertical path of movement of the ram 10. A spring 65 illustrates one means to urge the die parts 12 and 13 apart and thus cause them to separate after being closed by the prime mover.

It is intended that the split dies shall close and grip the respective workpieces and thereafter move toward one another to ram the workpieces together to form the butt weld union. The principles of die construction for the confinement of flow of the workpieces in order to produce a successful weld is now well known because of previous work done by applicant and applicant's assignees, and, accordingly, will not be further enlarged upon here. This invention pertains to the method and means for closing the die parts and for moving the dies together under high pressure and to the ratio of closing forces as well as to the production of a slight extrusion of the workpieces to overcome the tendency of the workpieces to retract within the dies under the forces produced in creating the butt weld.

Figure 3:
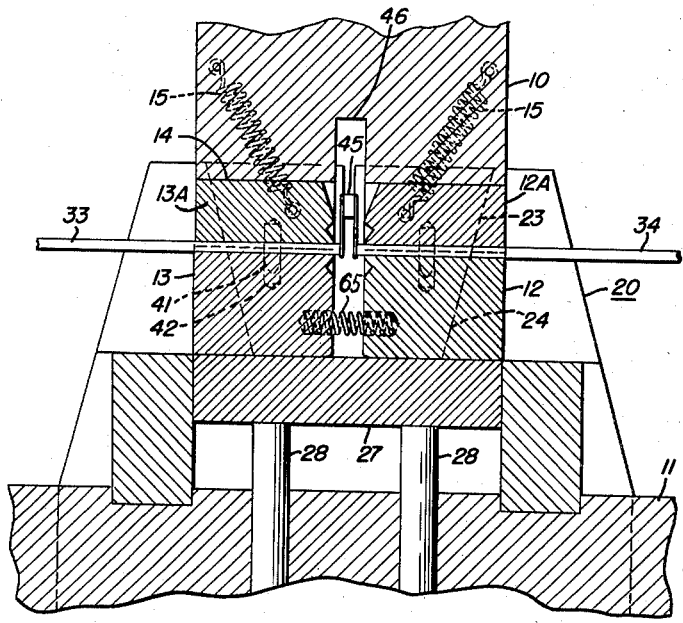
Figure 3 is a portion of the side view as in Figure 1 with the press in a partially closed position, and the dies in a fully closed position.
Figure 4:
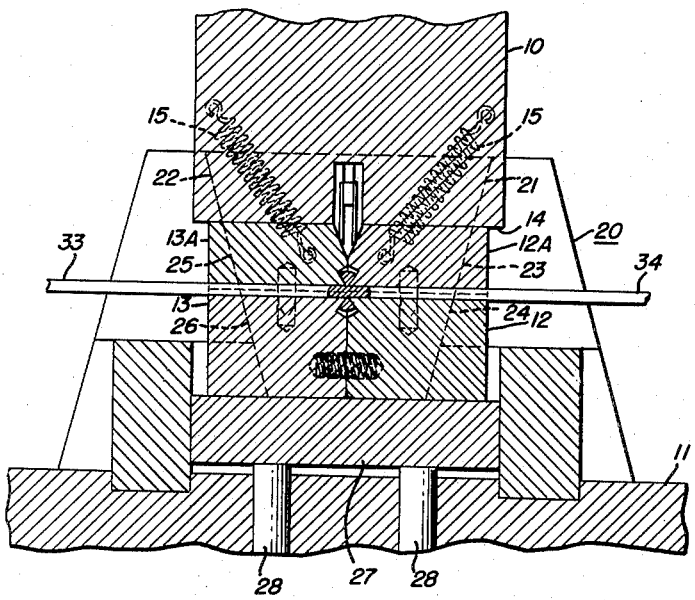
Figure 4 illustrates the end of the work stroke with the dies both closed and driven together to form a workpiece; and, Figure 5 is a fully schematic illustration of an alternate construction to further illustrate the principles of this invention.

A cam device 20 is seated upon the bed 11 in the illustrated embodiment of the invention or otherwise located with respect to other types of relatively movable prime movers. The cam device 20 is provided with tapering cam track surfaces 21 and 22. Die part 12A is provided with a cam follower surface 23 and die part 12 with a cam follower surface 24. Die part 13A is provided with a cam follower surface 25 and die part 13 is provided with a cam follower surface 26. Thus it will be observed as the ram 10 moves toward the bed 11, die parts 12A and 13A will first close upon the die parts 12 and 13 respectively, and thereafter the united split dies will be cammed toward one another as the force of the ram 10 acts through the split dies to force the table 27 to retract. Thus, the split dies are first closed and then rammed together as the entire assembly moves toward the bed 11. This succession of steps is illustrated in Figures 1, 3, and 4.

It should be apparent that the alignment of split die members under extreme pressure, and ramming such dies together into face-to-face contact, will assure correct alignment of the split die parts throughout the work cycle. Such is not the case, especially when using other than the preferred type of cam surfaces provided by cam device 20. Therefore, to obtain and maintain correct die registration, interlocking surfaces 41 and 42 are provided between the split die parts to engage upon closing of the dies.

The employment of downwardly tapering cam track surfaces is preferred to other possible types of cam track surfaces for producing the same closing movement because the retractable table 27 may be employed in conjunction with these downwardly sloping cam track surfaces to control the ratio of pressure between the split die parts with respect to the closing force of the split dies toward one another. This function is quite valuable and important in order to control the union of the workpieces and to produce the precise degree of extrusion from the dies necessary to compensate for the tendency of the workpieces to retract into the dies under the welding pressures. The die parts are provided with workpiece cavities 35 through 38 and are shaped to conform closely to the size and configuration of workpieces 33 and 34 which are indicated as being rod or wire. However, the workpiece cavities are preferably formed to create a workpiece holding cavity slightly smaller than the workpiece in order to assure a tight grip upon the workpieces and to produce the extrusion referred to.

The illustrated embodiment of the invention is adapted for use with rod or wire. Other forms, such as sheet, will require other forms of holding surfaces. Therefore, it is to be understood that the dies may be formed with any suitable gripping surface adapted for particular workpieces. Further, the bodies may be provided with gripping surfaces to hold a plurality of workpieces at once if the size of the workpieces will permit.

Extrusion of the workpieces 33 and 34 will take place only if desired and sufficient pressure between the split die parts created by resistance to movement of the ram 10 by the table 27. Such resistance is created and controlled in the illustrated embodiment of the invention by means of a plurality of support rods 28 extending into piston and cylinder snubber assemblies 29 located below the bed 11. Snubbers 29 are fluid-type snubbers and under pressure will tend to drive fluid from the snubbers 29 into a reservoir 30 through the illustrated regulating valve 31. The regulating valve 31 may therefore be adjusted to precisely control the resistance offered by table 27 to movement of the split dies and ram 10. The greater the resistance, the greater will be the closing force upon the workpieces 33 and 34. Alteration of this resistance alters the ratio of clamping force upon the workpieces with respect to ramming force of the workpieces together. By this means, and by the careful production of the size of the workpiece cavities, the exact amount of extrusion of the workpieces under the closing force between the dies may be precisely controlled.

The apparatus of this invention operates quickly to close the dies and ram the dies together to produce the work action. Because of the speed of operation, there is an impact produced between the workpieces. Such impact is believed to contribute to the efficiency of the invention and to aid in making possible the union of such materials as mild steel and titanium. Exacting proof of whether rapid action or proper confinement of flow under high temperature is the critical factor in producing good welds is not possible to determine. Slowly driven, manually operated dies have produced excellent welds in non-ferrous metals such as aluminum and copper. Of course, the operating power in such manually operated tools is limited. Furthermore, no impact is available in a manually driven tool. This invention both high operating pressures and impact. Accordingly, regardless of what the theory of operation may be, the fact is that the present invention is extremely efficient in producing unions between non-ferrous metals as well as some of the more difficulty weldable metals such as mild steel and titanium.

Although the concept of proper surface preparation and projection of workpieces from the dies is now old and well known due to other development work disclosed by applicant's assignees, the present invention provides a novel and desirable means for spacing workpieces with respect to the particular dies in this type of prime mover device. The face of the split dies must be carefully formed to produce a proper degree of flow of the workpieces under confinement to produce a good union. Therefore, the faces of the dies are formed with face upset cavities 39 and 40 to allow the workpieces to flow under confinement. A stop spacer 45 extends through the slot 46 in the ram 10 and is positioned to extend between the location of two workpieces inserted into the die parts 12 and 13 in the open position of the press as illustrated in Figure 1. The stop spacer is located with respect to the cam track surface 21 and 22 to provide the proper spacing of the workpieces with respect to the face of the split dies. In turn, the split dies are located by the cam surfaces 21 and 22 and this spacing can be properly accomplished by using the cam track surfaces as common locating surfaces. The thickness of the stop spacer will determine the extent to which the workpieces can project from the die parts 12 and 13. By placing the stop spacer 45 in the position illustrated in Figure 1, and by having the split dies progress downwardly under the force of the ram 10, the stop spacer 45 will permit the workpieces to be held in proper relationship until the die parts 12A and 13A fully clamp the workpieces and start the downward progression of the assembly. Downward movement of the assembled workpieces will cause the workpieces to drop below the location of the stop device where they will be free of interference by the stop spacer.

Figure 5:
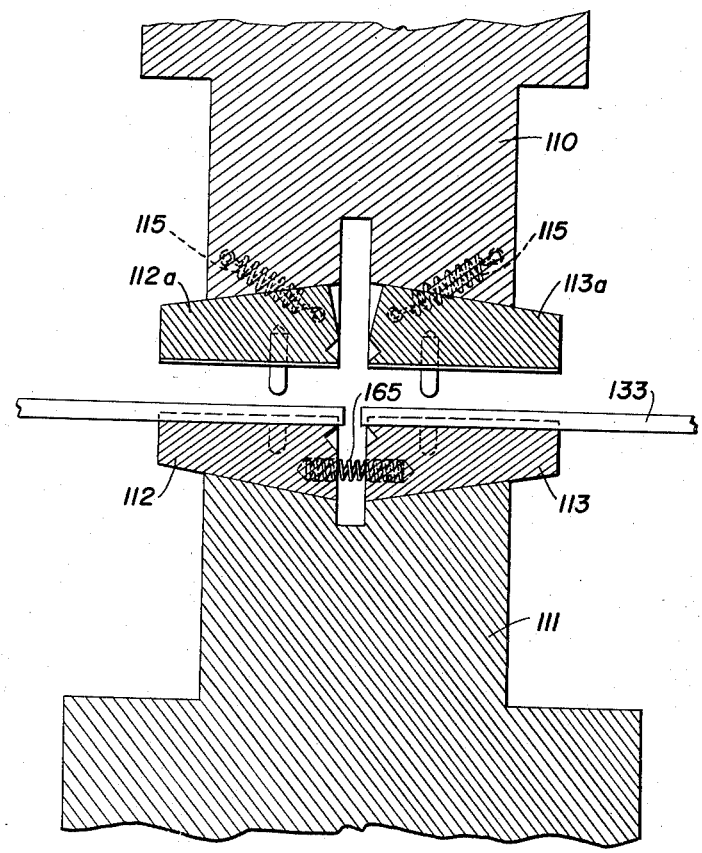

The Figure 5 construction differs from the construction shown by the preferred embodiment in Figure 1 in that each of the split dies cams with its own track surface, and then both dies move in opposite directions at a right angle to the workpieces being welded, while in the construction described and shown in Figure 1 both dies cam with the same track surface and move in the same direction at a right angle to the workpieces. Furthermore, according to the construction shown as the preferred embodiment, the workpieces are displaced at a right angle in addition to their moving together longitudinally, while in the Figure 5 construction of the drawing the workpieces remain in position during welding. This is a feature which may be of desirable interest for certain applications. A further distinction between the two designs consists in the different tapering or camming angles as further pointed out hereafter. The parts of the Figure 5 construction corresponding to the preferred embodiment have been numbered one-hundred digits higher for reference purposes.

Prior to the present invention, applicant and other assignors to applicant's assignee have developed tapered split dies which are lightly closed upon a workpiece and then driven together in opposed directions by carriages having tapered sockets to carry the dies. Under such arrangement, the closing pressure of the dies to hold the workpiece increases as the contact pressure between the workpieces and dies increases. This invention provides closing of a split die, and ramming of two such dies together by proportional components of a single force.

By the improved construction according to the present invention, there is provided a reverse arrangement utilizing the basic design of the gripping tools as previously practiced, but wherein the welding pressure is applied at a right angle to the workpieces instead of longitudinally as in the previously described design. This will afford both holding and gripping of the workpieces as well as movement of the dies toward each other during welding by a single operation or welding stroke. According to this invention, the applied pressure is subdivided by the camming arrangement into two components acting in different directions, viz., a gripping pressure at a right angle to the workpieces and a welding pressure component acting in the direction of and to effect upsetting and welding of the wires. Advantageously, the corresponding sections of each die, that is, 12 and 13 on the one hand and 12A and 13A on the other hand, are normally urged into an initial position, as indicated by the drawings, by the provision of springs or the like and acting on the corresponding sections of the dies instead of on the several sections of a single die.

In a construction of this type, due consideration must be given to the taper or camming angle of the dies which may be defined as the angle enclosed by the vectors describing the movement of the workpieces and of the die sections during welding. If this angle is small the gripping component at a right angle to the wires will be greater than the longitudinal component providing the welding pressure. By a suitable design of the taper angle, sufficient gripping force in relation to the welding pressure may be insured to possibly prevent slipping of the wires during the welding operation. This angular relationship should take into account the friction coefficient between the workpieces and the dies. For practical purposes, an angle of about 17° to 20° has been found to insure satisfactory results with a tool construction of the type shown in Figure 5.

In the preferred design according to the Figure 1, both dies cam with the same tapering track surface and move in the same direction under the effect of the applied welding pressure which makes it necessary to provide a yielding support such as in the form of a hydraulic buffer or the like shown and described with respect to the Figure 1, in order to insure uniform movement of the dies during welding.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Apparatus for forming workpieces, comprising first and second opposed force members adapted to close together in a work portion of a work cycle, first and second opposed die members positioned between said first and second force members, said first die member having a lock surface member projecting therefrom, said second die member having a recess socket to receive said lock surface, said lock surface member and said recess socket having a close guide interfitting relationship, said first and second die members having first and second cooperating die surfaces aligned with respect to one another from said lock surface and recess socket as a reference location, said first and second die members having a work cycle path transverse to the path of closing movement of said force members, and cam means adapted to develop a transverse force component upon said die members from the closing movement of the force members in the direction of the work cycle path of said die members.

2. Apparatus for forming workpieces, comprising first and second opposed force members adapted to close together in a work portion of a work cycle, first and second, opposed die members positioned between said first and second force members, said first and second die members having a work cycle path transverse to the path of closing movement of said force members, and cam means adapted to develop a transverse force component upon said die members from the closing movement of the force members in the direction of the work cycle path of said die members, said cam means embodying first and second laterally spaced stationary track means each having inwardly sloping guide surfaces in the direction of die closing in said die work cycle path upon which the first and second dies may ride respectively to open and close, and a retractable support to hold the dies and resist movement of the dies in said closing direction, the resistance having a magnitude resulting in a compression force upon each said die member at least as great as the said transverse force component, whereby the closing movement of the force members is partially converted into transverse die closing movement by the guide surfaces, and the ratio of compression force to die closing force is controlled by the resistance offered by said retractable support.

3. Apparatus for gripping and forming the butt end of workpieces comprising a ram device operable in a reciprocable work cycle between a first and second position, a cushion device yieldably opposed to movement of said ram device through at least a portion of the ram device movement from said first to said second position, a first and a second split die member each having a plurality of die sections mated together, closely dimensioned cooperating guide pin and recess socket locking surfaces between the die sections of each split die, said die sections having contact surface formations defining a workpiece holding cavity in each die member, each die member having a die face opposed to the die face of the other die member, said workpiece holding cavity in each die member opening in the die face thereof, said die face and holding cavity in each die member being located from the guide pin and recess socket as a reference location, first and second laterally spaced track means coextensive with the work cycle path of said ram device converging toward said cushion device, said first and second split die members riding said first and second laterally spaced track means respectively, said guide pin and recess socket of the die sections determining the accuracy of mating of the split die sections, said track means determining the accuracy of closing of said first and second split die members as well as serving to convert movement of said ram device in said work cycle path to lateral closing movement of said first and second split dies, the resistance to movement by said cushion device determining the ratio of compression upon the sections of the split dies to the closing force component developed by said track means, and having a magnitude resulting in a compression force upon each split die at least as great as said transverse force component.

4. Apparatus for gripping and forming the butt end of workpieces, comprising a ram device operable in a reciprocable work cycle between a first and second position, a cushion device yieldably opposed to movement of said ram device through at least a portion of the ram device movement from said first to said second position, a first and second split die member each having a plurality of die sections mated together, said die sections having contact surface formations defining a workpiece holding cavity in each die member, each die member having a die face opposed to the die face of the other die member, said workpiece holding cavity in each die member opening in the die face thereof, first and second laterally spaced track means coextensive with the work cycle path of said ram device converging toward said cushion device, said first and second split die members riding said first and second track means respectively, said track means determining the accuracy of closing of said split first and second die members as well as serving to convert movement of said ram device in said work cycle path to lateral closing movement of said first and second split dies, the resistance to movement by said cushion device determining the ratio of compression upon the sections of the split dies to the closing force component developed by said track means and having a magnitude resulting in a compression force upon each split die at least as great as said transverse force component, said cushion device having a limited movement in relationship to the movement of the ram device to thereby provide a space between the first position of the ram device and said cushion device greater than the dimension of the split dies, and means to carry sections of each die on the cushion device and an the ram device.

5. Apparatus for gripping and forming the butt end of workpieces comprising first and second split die members each having a plurality of die sections mated together, said die sections having contact surface formations defining a workpiece holding cavity in each die member, each die member having a die face opposed to the die face of the other die member, said workpiece holding cavity in each die member opening in the die face thereof, converging first and second unitary track means, said die members being reciprocable between first and second stations on said track means, said die members being spaced at said first station with the die faces thereof separated, the face contact position of the dies constituting the second station and means to drive said die members between said first and second stations.

References Cited in the file of this patent

UNITED STATES PATENTS

| 2,144,231 | Schwarz | Jan. 17, 1939 |
| 2,357,204 | Joyner | Aug. 29, 1944 |
| 2,364,938 | Beard | Dec. 12, 1944 |
| 2,544,447 | Dodds | Mar. 6, 1951 |

FOREIGN PATENTS

| 160,816 | Great Britain | June 29, 1922 |
| 689,927 | Great Britain | Apr. 8, 1953 |
| 1,075,750 | France | Oct. 19, 1954 |